United States Patent [19]

Perigo et al.

[11] 3,747,291
[45] July 24, 1973

[54] WEAR RESISTANT ASSEMBLY
[75] Inventors: Leon A. Perigo, Arvada; John A. Jordan, Denver, both of Colo.
[73] Assignee: Coors Porcelain Company, Golden, Colo.
[22] Filed: Aug. 13, 1971
[21] Appl. No.: 171,661

[52] U.S. Cl. ........................ 52/127, 287/189.36 B
[51] Int. Cl. ........................ B23k 9/00, F16b 5/08
[58] Field of Search .................. 52/127, 506, 513, 52/391; 287/189.36 B; 219/127

[56] References Cited
UNITED STATES PATENTS
3,624,344  11/1971  Kutzer ........................ 219/127
2,863,314  12/1958  Van Voorden ................ 52/378
2,684,588  7/1954  Robertson ..................... 52/426
3,575,448  4/1971  Licari ..................... 287/189.36 B
2,021,610  11/1935  Quint ............................ 52/513

FOREIGN PATENTS OR APPLICATIONS
899,672  6/1962  Great Britain ..................... 52/506

Primary Examiner—Price C. Faw, Jr.
Attorney—McGlynn, Reising et al.

[57] ABSTRACT

A wear resistant assembly including a metal support structure and ceramic plate members attached thereto. The ceramic plates each have at least one hole therethrough which has a tapered bottom and a metal insert is disposed in the hole, the insert being cup shaped and having its bottom welded to the metal support for attaching the ceramic plates to the metal support. The metal insert is circumferentially contractable so that when it is inserted into the hole it is frictionally retained in the hole for shipment, etc.

3 Claims, 4 Drawing Figures

PATENTED JUL 24 1973   3,747,291

INVENTORS
Leon A. Perigo &
BY John A. Jordan
Barnard, McGlynn & Reising
ATTORNEYS

WEAR RESISTANT ASSEMBLY

There are many situations in which it is desirable to attach a non-metallic wear resistant member to metal, as for example, the attachment of aluminum oxide ceramic plates to a metal backing member. More specifically, such ceramic plates are frequently attached to metal support or backing members in chutes or spouts, in certain conveyors, etc. The ceramic plates have a higher resistance to wear than metals.

This invention relates to the attachment of such ceramic plates to a metal support member. In accordance with the instant invention, a ceramic plate has a hole extending from the outward face to the inward face and a metal insert is disposed in and frictionally retained in the hole so that the insert remains in position during shipment of the ceramic plates and during handling and placement into position for welding the insert to the metal support member. The invention overcomes the problem of retaining a metal insert in a hole in a ceramic plate while the ceramic plate is being positioned for welding the insert to a metal backing member.

Accordingly, it is an object and feature of this invention to provide such a wear resistant assembly which includes a non-metallic member having a hole extending therethrough and a metallic member frictionally held in the hole.

In correlation with the foregoing object and feature, it is another object and feature of this invention to provide such an assembly wherein the metal insert is contractable so as to be self-biasing outwardly to frictionally engage the hole in the non-metallic member.

In correlation with the foregoing objects and features, it is another object and feature to provide such an assembly wherein the metal insert is circular with a centrally disposed opening therethrough and a slot extending from the opening to the periphery thereof whereby the insert is circumferentially contracted when forced into the hole so as to be frictionally retained therein.

In correlation with the foregoing objects and features, it is another object and feature of this invention to provide such an assembly wherein the insert is frusto-conical with a base and a side wall extending upwardly and outwardly therefrom with the opening being in the base and the slot extending radially outwardly therefrom.

Other objects and attendant advantages of the present invention will be readily appreciated as the same becomes better understood by reference to the following detailed description when considered in connection with the accompanying drawings wherein:

FIG. 1 discloses a chute or tunnel through which abrasive materials may pass.

Figure 1:
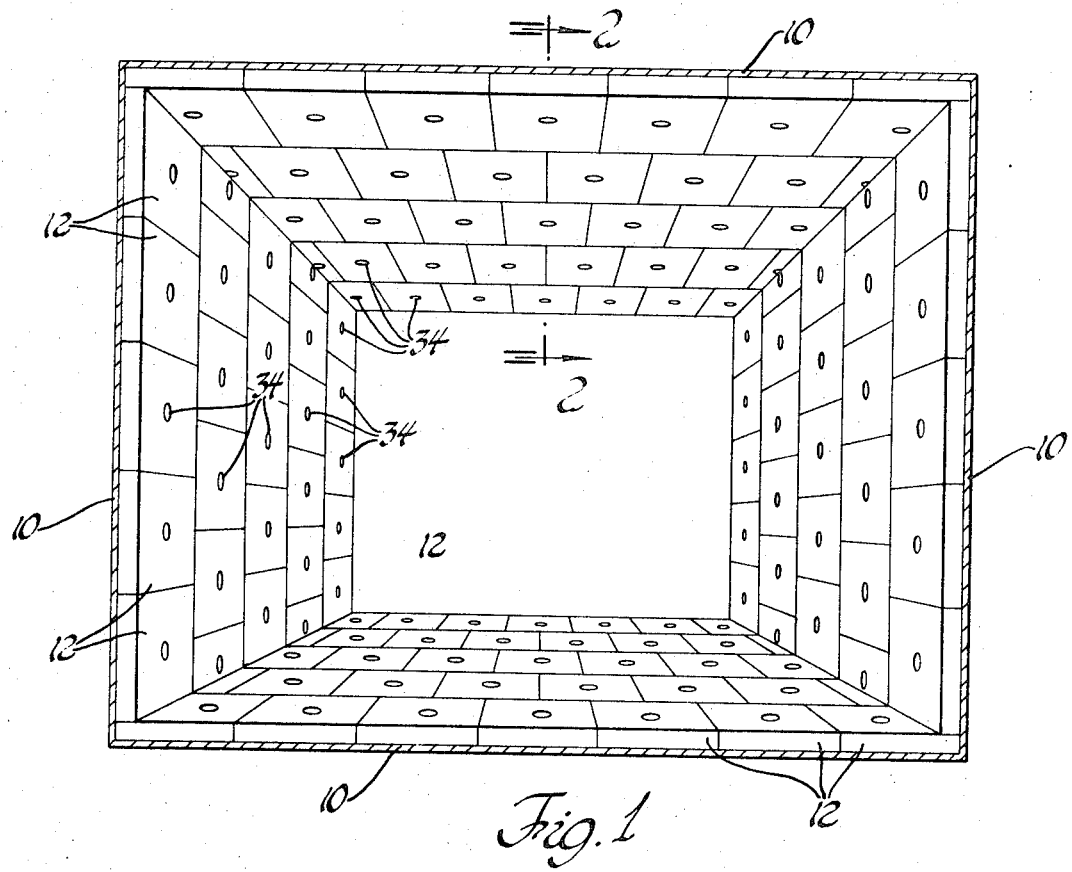

The assembly includes a metal support structure comprising the walls 10. Attached to the walls 10 are a plurality of wear resistant non-metallic plate members 12. The plate members 12 are preferably an aluminum oxide ceramic. Non-metallic for the purposes of description means non-weldable, as for example a modified boron carbide including a silicone.

Each ceramic plate 12 has a hole generally indicated at 14 extending therethrough from the outward face 16 to the inward face 18 of the ceramic plate 12.

A metallic insert generally shown at 20 is frictionally held in the hole 14 whereby the insert may be welded to the metal support structure 10 for attaching the associated ceramic plate 12 thereto. The insert 20 is contractable so as to be self-biasing outwardly to frictionally engage the hole 14.

More specifically, the hole 14 is configured to prevent the insert 20 from being moved through the hole 14 toward the inward face 18 by including a frusto-conical portion 22 adjacent the inward wall 18.

The insert 20 is generally annular in configuration therethrough. The insert 20 is rendered circumferentially discontinuous by with a centrally disposed opening 24 therethrough and a slot 26 extending from the opening to the periphery of the insert whereby the insert is circumferentially contracted when forced into the hole 14 so as to be frictionally retained therein. The hole 14 includes a cylindrical portion 28 which extends upwardly from the conical portion 22. As the insert 20 is forced into the hole 14, the insert circumferentially contracts so as to engage the cylindrical surface 28. The insert 20 is frusto-conical with a base 30 and a side wall 32 extending upwardly and outwardly from the base 30. The opening 24 is disposed centrally within the base 30 and the slot 26 extends radially outwardly from the opening 24.

Figure 2:
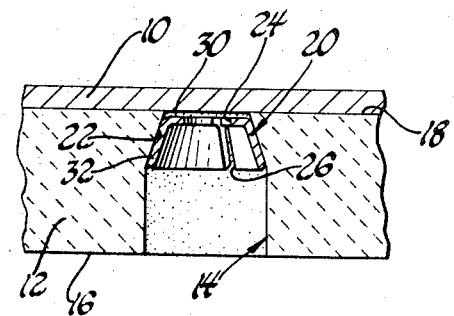
FIG. 2 is a cross sectional view of a preferred embodiment of the instant invention.
Figure 4:
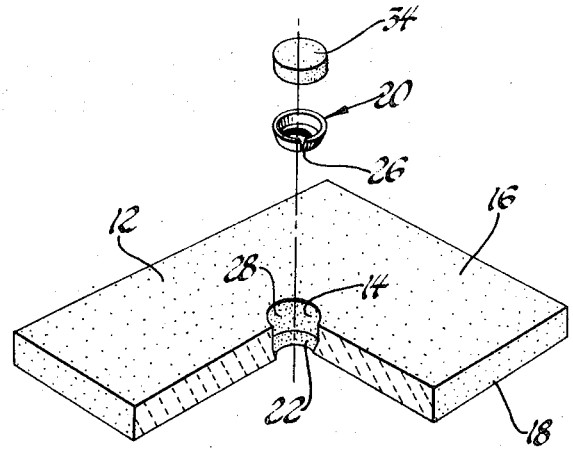
FIG. 4 is an exploded perspective view partially in cross section of a single ceramic plate utilizing the attaching means of the instant invention.

The frusto-conical portion 22 of the hole 14 coacts with the side wall 32 of the insert as illustrated in FIG. 2.

FIG. 2 shows the assembly in position for welding the metal insert 20 to the metal backing wall 10. The metal insert 20 is in frictional engagement with the hole 14 and is therefore prevented from falling by gravity out of the hole 14. An installer may therefore hold the plate 12 in position with one hand and inject a welding rod into the hole 14 with the other hand to weld the insert 20 to the metal wall 10.

Figure 3:
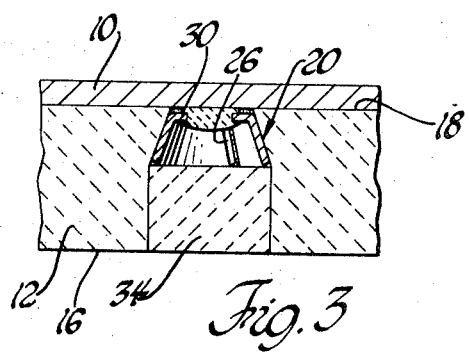
FIG. 3 is an enlarged cross sectional fragmentary view taken substantially along 2—2 of FIG. 1.

The assembly also includes a ceramic plug 34 for insertion into the hole 14 after the insert is welded to the metal support structure. This is more specifically shown in FIG. 3 wherein the insert 20 is shown welded to the metal wall 10 and the plug 34 is disposed in engagement with the cylindrical wall portion 28 of the hole 14. The ceramic plug 34 covers the insert 20 and forms a part of or is coplanar with the outward wall 16. The ceramic plug may be disposed in position with an appropriate adhesive.

It will be appreciated that the ceramic plates 12 may be shipped from their place of manufacture with the inserts 20 disposed therein and that the inserts 20 will not be inadvertently removed or fall from the holes 14. Further, when the ceramic plates 12 are being positioned for welding, there need not be concern for placement of the metal inserts because the inserts are frictionally retained in position and may be appropriately welded to the metal support structures such as the walls 10.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

We claim:

1. Apparatus for securely affixing at least one wear-resistant ceramic plate to an underlying weldable metallic surface comprising in combination: a wear-resistant ceramic plate having first and second opposite surfaces, said second surface being configured to lie substantially against said underlying surface, said plate having a hole formed therein and extending fully between said first and second surfaces, said hole having a tapered portion the diameter of which decreases toward said second surface to form a socket, a weldable metallic insert of generally annular configuration having a base and tapered sides dimensioned to seat securely within and in frictional engagement with said socket such that the base is substantially adjacent said underlying surface, said base being open to expose a portion of said underlying surface when the insert is disposed within said socket, said insert being circumferentially discontinuous and of such diameter relative to said socket as to be contracted when seated into said socket to be frictionally retained therein before and during welding of the insert to the underlying surface irrespective of the orientation of the plate.

2. Apparatus as defined in claim 1 wherein said insert is rendered circumferentialy discontinuous by means of an axial slot extending fully through said base and tapered sides.

3. Apparatus as defined in claim 1 including a ceramic plug disposed within said hole between said first surface and said insert to conceal said insert and to fill said hole.

* * * * *

UNITED STATES PATENT OFFICE
CERTIFICATE OF CORRECTION

Patent No. 3,747,291  Dated July 24, 1973

Inventor(s) Leon A. Perigo; John A. Jordan

It is certified that error appears in the above-identified patent and that said Letters Patent are hereby corrected as shown below:

Col. 2, lines 16-19, delete "The insert 20 is generally annular in configuration therethrough. The insert 20 is rendered circumferentially discontinuous by with a centrally disposed opening 24 therethrough and", and insert therefor --The insert 20 is generally annular in configuration with a centrally disposed opening 24 therethrough. The insert 20 is rendered circumferentially discontinuous by--.

Signed and sealed this 9th day of April 1974.

(SEAL)
Attest:

EDWARD M. FLETCHER, JR.
Attesting Officer

C. MARSHALL DANN
Commissioner of Patents